UNITED STATES PATENT OFFICE.

OSCAR BALLY AND MAX HENRY ISLER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 818,992.      Specification of Letters Patent.      Patented April 24, 1906.

Original application filed January 31, 1905, Serial No. 243,571. Divided and this application filed October 10, 1905. Serial No. 282,217.

*To all whom it may concern:*

Be it known that we, OSCAR BALLY, doctor of philosophy and chemist, and MAX HENRY ISLER, citizens of the Swiss Republic, residing at Mannheim, in the Grand Duchy of Baden, German Empire, have invented certain new and useful Improvements in Anthracene Dye and Process of Making the Same, which invention is divided, pursuant to the requirement of the Patent Office, out of United States Letters Patent, dated January 9, 1906, No. 809,892, of which the following is a specification.

New compounds of the anthracene series containing a benzanthrone group can be obtained by condensing certain anthracene compounds with glycerin. (See Letters Patents Nos. 786,085, 787,859, and 798,104.) We have discovered that these new benzanthrones upon being treated with caustic alkali yield valuable coloring-matters possessing dyeing properties similar to those of indanthrene, and we have described this invention in United States Letters Patent, dated January 9, 1906, No. 809,892, which contains generic claims for coloring-matters which can be produced by treating a benzanthrone with caustic alkali and also for the process for producing the same.

In the present application we make no generic claim for the production of coloring-matters from benzanthrones and for the coloring-matters themselves, but we wish to claim specifically the coloring-matters obtainable by treating with caustic alkali a benzanthrone which can be obtained by condensing with glycerin an anthracene body free from nitrogen (as described in the specification of Letters Patent No. 787,859) and the process for producing these coloring-matters, which are soluble in concentrated sulfuric acid, giving blue solutions, and they dissolve in alkaline hydrosulfite, yielding blue to bluish-red vats which dye vegetable fiber substantively giving violet shades. In particular the coloring-matter obtainable from oxanthranol yields a fuchsin-red vat with alkaline hydrosulfite.

The following example will serve to further illustrate the nature of our invention, which, however, is not confined to this example. The parts are by weight.

Introduce ten (10) parts of the condensation product obtainable from oxanthranol, glycerin, and sulfuric acid into from fifty (50) to sixty (60) parts of melted caustic potash at a temperature of one hundred and eighty (180°) degrees centigrade. Then raise the temperature of the melt to from two hundred and thirty (230) to two hundred and forty (240°) degrees centigrade, and maintain this temperature until a test portion shows that no more coloring-matter is being formed. Dissolve the melt in a large excess of water, boil, filter while hot, and wash the precipitate on the filter with hot water. A violet paste is obtained which is ready for further use. When dried, the coloring-matter consists of a dark violet powder, which, when rubbed, assumes a shining coppery appearance. It is insoluble in dilute acids and alkalies, but in concentrated sulfuric acid it dissolves, the solution being dull violet. It is difficultly soluble in most organic solvents, but can be crystallized out of boiling quinolin, and be thus obtained in slender needles, which dissolve in concentrated sulfuric acid, the solution being a pure violet. On warming with alkaline hydrosulfite solution the coloring-matter yields a beautiful fuchsin-red vat which dyes vegetable fiber red violet. These shades on being washed become bluish violet and are extremely fast against the action of chlorin.

Now what we claim is—

1. The process for the production of anthracene coloring-matters by treating with caustic alkali a hereinbefore-defined benzanthrone compound obtainable by condensing together an anthracene body which does not contain nitrogen, and glycerin.

2. The process for the production of anthracene coloring-matters by treating with caustic alkali a hereinbefore-defined benzanthrone compound obtainable by condensing together oxanthranol and glycerin.

3. As new articles of manufacture, the anthracene coloring-matters which can be obtained by treating with caustic alkali a benzanthrone obtainable from an anthracene body which does not contain nitrogen, which coloring-matters dissolve in concentrated sulfuric acid, yielding blue solutions, and which dissolved in alkaline hydrosulfite yielding blue to bluish-red vats which dye vegetable fiber substantively giving violet shades.

4. As a new article of manufacture the anthacene coloring-matter which can be obtained by treating with caustic alkali the benzanthrone obtainable from oxanthranol, which coloring-matter dissolves in concentrated sulfuric acid yielding a blue solution, and which dissolves in alkaline hydrosulfite yielding a bluish-red vat which dies vegetable fiber substantively yielding violet shades.

In testimony whereof we have hereunto set our hands in the presence of two subscribing witnesses.

OSCAR BALLY.
MAX HENRY ISLER.

Witnesses:
ERNEST F. EHRHARDT,
J. ALEC. LLOYD.